United States Patent Office

3,784,537
Patented Jan. 8, 1974

3,784,537
CONJUGATION OF UNSATURATED FATTY MATERIALS
Roland Pierre Franz Scharrer, Pelham, N.Y., assignor to Arizona Chemical Company, New York, N.Y.
No Drawing. Filed Dec. 17, 1971, Ser. No. 209,407
Int. Cl. C09f 7/08; C11c 3/14
U.S. Cl. 260—97.5
11 Claims

ABSTRACT OF THE DISCLOSURE

A process for treating unsaturated fatty materials is given whereby they are conjugated in a homogeneous system by heating in the presence of substituted aryl thiols, monosulfides, and polysulfides.

---

This invention relates to the conjugation of olefins. More particularly, it relates to a novel catalyst system which is useful in the conjugation of unsaturated fatty acid materials.

There has been much interest in the conjugation of olefins as demonstrated by the voluminous academic literature in recent years. Many patents have also recently issued concerning the conjugation of polyolefinic fatty materials. The utility of these materials comes from the fact that conjugated diene compounds are more reactive chemically than their non-conjugated isomers. In the case of drying-type oils or fatty acids, it has been repeatedly demonstrated that coatings derived from conjugated dienes dry faster than those from non-conjugated dienes. Conjugated dienes also react to form Diels-Alder adducts with great facility at low temperatures which greatly simplifies the preparation of adduct resins for such uses in resins and electrocoatable water base paints.

Many of the prior art teachings and patents directed toward conjugation of fatty materials involve strenuous process conditions and/or extensive process sequences. For example, the teachings of U.S. Pat. 2,350,583 issued to Bradley disclose that conjugation of unsaturated fatty acid materials may be carried out at temperatures in excess of 200° C., under pressure, and in the presence of an excess of alkali. U.S. Pat. 2,359,404 issued to Colgate and Ross discloses that conjugation with a selenium catalyst takes place in the temperature range of 275–300° C. Many other methods of conjugation are known including those requiring acid conditions and/or expensive metal catalysts. None is fully satisfactory either from the standpoint of economics or acceptability of the final product.

It is an object of this invention to provide a simple economic process for the conjugation of olefins. It is yet a second object of this invention to provide for a conjugation process which gives a product of high purity. Other objects and advantages will become apparent from a reading of the ensuing specification.

It has been surprisingly found that by using a small amount of inexpensive, readily available, sulfur-containing organic catalysts, a satisfactory conjugation reaction process can occur. This reaction goes under relatively mild conditions and gives an excellent yield of desirable light colored products.

This process can be applied to a variety of polyolefin substrates, such as, but not limited to non-conjugated hydrocarbon dienes; fatty oils containing polyunsaturated fatty chains such as linseed oil, soy oil, and fish oil; and pure and mixed polyunsaturated fatty acids such as linoleic, linolenic and tall oil fatty acids; and tall oil.

It is particularly noteworthy that this process operates under mild conditions of reacton which allows application of the process to polyolefin materials having reactive sites or functional groups appended, such as, for example carboxyl, amide, amine, ester, and many other groups.

The catalysts of this invention may be generally described as sulfur-containing organic compounds. The sulfur may be present as a thiol, a monosulfide, or a polysulfide. Broadly the catalysts of my invention may be classified as follows:

Class I: 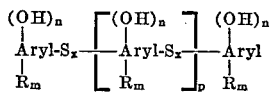

where $x$ may be an integer from 1 to 3 inclusive, $n$ may be an integer from 1 to 3 inclusive, $p$ may be an integer from 0 to 100 and preferably about 5 to 20 inclusive, and the sum of $m$ and $n$ on each Aryl is preferably between 1 and 5 inclusive. R is a hydrocarbon group, such as, for example, $C_1$–$C_8$ alkyls, cycloalkyls and substituted alkyl, wherein the substituents are cycloalkyl, aryl, alkaryl, and the like and desirably contains from 1 to 22 carbon atoms. Preferred alkyl groups are straight chain, secondary, and tertiary alkyl groups containing up to 8 carbon atoms. Preferred Aryl groups are those containing 6 to 18 carbon atoms and typically include phenyl, naphthyl, and phenanthryl. Typical cycloalkyl groups contain 3–8 carbon atoms in the ring such as, for example, cyclopropyl, cyclopentyl, and cyclohexyl.

In Class I when Aryl is phenyl it will be apparent that when $p$ is 0 the sum of $m$ and $n$ on each phenyl ring will not be more than 5 and when $p$ is 1 or higher the sum of $m$ and $n$ on each phenyl ring will not be more than 4. It will also be apparent, however, the values for $n$ and $m$ may range higher when Aryl is naphthyl or phenanthryl. The values for $m$, $n$, $x$, and $p$, except when 0, are positive, whole numbers.

Included are compounds and position isomers having groups designated above as R, of mixed character. The R group or groups on one aryl ring may differ from the R group or groups on the other aryl rings. Now $m$ and $n$ may be the same or different for each aryl ring; and when more than one R group is present on an aryl ring, such groups may be identical or different.

Class II: 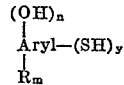

where $n$ may be an integer from 1 to 4 inclusive, $y$ may be an integer from 1 to 3 inclusive, $m$ is an integer from 0 to 4, and the sum of $m$, $n$, and $y$ cannot exceed the substitutable positions on the aryl ring. In Class II compounds only one aryl nucelus is involved. R is a hydrocarbon group, such as, but not limited to alkyl, cycoalkyl, and substituted alkyl including but not limited to carbon-containing compounds from 1 to 10 carbon atoms. These may have substituent groups of cycloalkyl, aryl, and alkaryl. Preferred alkyl groups are straight chained, secondary, and tertiary alkyl groups containing up to 8 carbon atoms. Preferred aryl groups are those containing 6 to 14 carbon atoms. Typically included are phenyl, naphthyl, and phenanthryl. Typical cycloalkyl groups contain 3 to 6 carbon atoms in the ring and include but should not be limited to cycloroyl, cyclopentyl, and cyclohexyl. Included are compounds and positive isomers having R groups of mixed character; when more than one R group is present on the aryl ring such groups may be identical or different.

Class III: 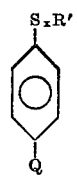

where x is 1 to 3 inclusive, R' is H or

and Q is $CH_3$, $NH_2$, $NO_2$, and halogen including but not limited to chlorine.

As can be seen, the sulfur-containing organic catalysts of this invention are substituted aryl thiols, substituted aryl monosulfides, and substituted aryl polysulfides. Preferred catalysts include but are not limited to the following:

1-thiol-2-naphthol
5-t-butyl-1-thiol-2-naphthol
2,4-dihydroxythiophenol
2-hydroxythiophenol
p-chlorobenzene thiol
4-nitrophenyl disulfide
para-toluenethiol
4-aminophenyl disulfide
bis(para-tolyl) sulfide
4,4'-thiobis(resorcinol)
1,1'-dithio-di-2-naphthol
2,2'-thiobis-4-methyl-6-t-butylphenol
1,1'-dithiobis(5-tert-butyl-2-naphthol)
4,4'-dithio-diresorcinol
poly-thiobis(resorcinol)

and similar compounds as defined in U.S. Pat. 3,377,334.

In accordance with this invention, I have found that by controlling the heat, the time of reaction, and the effective amounts of catalyst, a satisfactory conjugation reaction takes place which gives a pure product in good yield.

By "effective amount" of the catalyst is meant sufficient concentration of the material to provide catalytic conjugation. The amounts may be further described as minor or catalytic amounts ranging from about 0.05% to about 2.0% by weight based upon the feed composition. It is preferred to use between 0.1% and 0.5%.

While unsaturated vegetable and animal fatty acid materials may be effectively employed, particularly desirable materials are methylene interrupted polyolefin systems. These include polyunsaturated fatty acids such as, but not limited to tall oil fatty acids, linoleic acids, and tall oil fatty acid esters; polyunsaturated oils such as, but not limited to soy bean oils and linseed oils; polyunsaturated hydrocarbons; and polyunsaturated cyclic hydrocarbons.

The conjugation reactions of this invention take place at temperatures of from about 180° C. to about 270° C. and preferably from about 200° C. to about 230° C. Higher temperatures will require shorter times for the conjugated reaction to reach completion. Generally from about ¼ of an hour to about 8 hours is employed. It should be clear that shorter times of reaction with slightly higher temperatures are preferred. Also, higher catalyst concentrations can be employed with lower temperatures to keep the reaction time down.

By this invention a novel variety of methylene interrupted di- or polyolefin systems may be converted to conjugated butadiene systems. By conjugated double bond or butadiene systems is meant substituted 1,3-butadiene systems of the trans-trans, trans-cis, cis-cis, or cis-trans types and mixtures thereof. The general formula for these is as follows:

$$RCH=CH-CR'R''-CH=CHR'''$$

where R and R''' may be hydrogen or any organic group, and R' and R'' may be the same subject to the provision that one of R' or R'' must in any given reactant be hydrogen. However, it should be noted that both R' and R'' will generally be hydrogen. The following reaction is but one of many that the invention embraces:

$$CH_3(CH_2)_4CH=CH-CH_2-CH=CH(CH_2)_7COOH \xrightarrow[\text{heat}]{\text{catalyst}}$$
(9,12-non-conjugated linoleic acid)

$CH_3(CH_2)_5CH=CH-CH=CH(CH_2)_7COOH$ +
(9,11-conjugated linoleic acid)

$CH_3(CH_2)_6CH=CH-CH=CH(CH_2)_6COOH$
(8,10-conjugated linoleic acid)

The following examples are presented to exemplify the invention but should not be taken as limitive thereof except as appears in the appended claims. All parts and percentages are by weight unless it appears otherwise. Analysis was conducted by conventional ultra-violet techniques to determine percent conjugation.

EXAMPLE 1

This examplifies a method for production of highly conjugated tall oil fatty acids by using a variety of aromatic phenolic sulfur-containing catalysts.

Tall oil fatty acids containing initially 6.7% conjugated fatty acids and 34% non-conjugated linoleic-type fatty acids were treated with 0.4% by weight of catalyst at 220° C. for 7 hours.

Table I below shows the catalysts used and the total conjugated linoleic acid produced after 6 hours.

TABLE I

| Catalyst: | Percent conjugation |
| --- | --- |
| 1-thiol-2-naphthol | 21 |
| 2,2'-thiobis-4-methyl-6-t-butylphenol | 17 |
| 4,4'-thiobis(resorcinol) | 24 |
| 1,1'-dithio-di-2-naphthol | 26 |
| Poly-thiobis(resorcinol) | 27 |
| 2,4-dihydroxythiophenol | 27 |
| Control (no catalyst added) | 7 |

EXAMPLE 2

This example demonstrates that variety of products containing methylene interrupted, double bond systems can be conjugated by treatment with an aromatic phenolic sulfur-containing catalyst at elevated temperatures. The experimental details of Example 1 were followed with the catalysts and reactions noted in Table II below. Catalyst 1 was 4,4'-thiobis(resorcinol), Catalyst 2 was 1,1'-dithio-di-2-naphthol, and Catalyst 3 was 1-thiol-2-naphthol. The percentage of conjugated double bond system present before and after reaction is shown.

TABLE II

| Reaction | Catalyst | Percent conjugation | |
| --- | --- | --- | --- |
| | | Before | After |
| Isooctyl ester of tall oil fatty acid | 1 | 5.0 | 21.1 |
| Soy fatty acid | 2 | 1.4 | 30.5 |
| Linseed fatty acid | 2 | 2.8 | 17.7 |
| Soy oil | 3 | 0.5 | 30.8 |

EXAMPLE 3

This example shows that conjugated diene is rapidly formed in proportion to the amount of catalyst present when the reaction is run at a constant temperature. The experimental conditions of Example 1 were used except for variation in the amount of catalyst and the times of reaction. The same catalyst 1,1'-dithio-di-2-naphthol was used in all cases.

TABLE III

| Weight percent of catalyst | Percent conjugation | | |
| --- | --- | --- | --- |
| | 1 hour | 2 hours | 7 hours |
| 0.05 | 11.4 | | |
| 0.10 | 12.0 | 14.6 | |
| 0.20 | 15.6 | 19.2 | 24.6 |
| 0.60 | 29.8 | 31.4 | |
| 1.0 | 32.7 | 33.0 | |

EXAMPLE 4

This example demonstrates that the conjugation reaction of this invention occurs very rapidly, even at short contact times. A 2550 gram sample of tall oil fatty acid of analysis similar to that described in Example 1 was heated to 250° C. under a nitrogen atmosphere. 0.2% by weight of 1,1'-dithio-di-2-naphthol was introduced in an additional 50 grams of the fatty acid and the mixture was held at a constant temperature of 250° C. The results are reported in Table IV below.

TABLE IV

| Time (minutes): | Percent conjugation |
| --- | --- |
| 0 | 6.0 |
| 10 | 16.3 |
| 20 | 20.2 |
| 40 | 24.0 |
| 50 | 24.8 |
| 90 | 24.0 |

EXAMPLE 5

Following the time, temperatures, and other conditions of Example 1, the catalysts of Table IV were evaluated to show their effect.

TABLE V

| Catalyst: | Percent conjugation |
| --- | --- |
| Control (no catalyst) | 6.8 |
| 4-nitrophenyl disulfide | 13.3 |
| 4-aminophenyl disulfide | 16.7 |
| Bis(para-tolyl)sulfide | 14.8 |

EXAMPLE 6

The rate of formation of the conjugated double system has been found to be generally related to the temperature of the reaction system. This is demonstrated here. The conditions of Example 1 were repeated four times at the temperatures shown in Table V. 0.4% of 1,1'-thio-di-2-naphthol was employed as the catalyst and each test ran seven hours before the percent conjugation was determined by ultra-violet techniques.

TABLE VI

| Reaction temperature, ° C.: | Percent conjugation |
| --- | --- |
| 190 | 18.0 |
| 210 | 23.6 |
| 230 | 27.9 |
| 250 | 19.0 |

This table demonstrates that maximum conjugation occurs in the preferred range. At higher temperatures the conjugated product is sacrificed for other reaction products including dimers and trimers.

I claim:

1. A process for conjugating a methylene interrupted polyolefin fatty material which comprises: heating at a temperature ranging from 180° C. to 270° C. the said methylene interrupted polyolefin fatty material in the presence of an effective amount of a catalyst for a time sufficient to attain conjugation of said polyolefin fatty material, the catalyst being selected from the group consisting of:

(I) 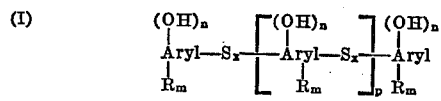

wherein $x$ is an integer from 1 to 3, $n$ is an integer from 1 to 3, $p$ is from 0 to 100, the sum of $m$ and $n$ on each Aryl is from 1 to 5, Aryl is selected from the group consisting of phenyl, naphthyl, and phenanthryl, and R is a hydrocarbon group containing 1 to 22 carbon atoms;

(II) 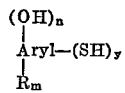

where $n$ is an integer from 1 to 4, $y$ is an integer from 1 to 3, $m$ is an integer from 0 to 4, R is a hydrocarbon group containing 1 to 10 carbon atoms, and the sum of $m$, $n$, and $y$ cannot exceed the substitutable positions on the Aryl ring, said Aryl being selected from the group consisting of phenyl, naphthyl, and phenanthryl; and (III) 

where $x$ is an integer from 1 to 3, R' is H or Q

and Q is $CH_3$, $NH_2$, $NO_2$, and halogen, terminating the reaction, and recovering a conjugated fatty material in good yield and purity.

2. The process of claim 1 wherein said catalyst is polythiobis(resorcinol).

3. The process of claim 1 wherein said catalyst is 2,4-dihydroxythiophenol.

4. The process of claim 1 wherein said catalyst is 2-hydroxynaphthalene-1-thiol.

5. The process of claim 1 wherein said catalyst is 2,2'-thiobis-4-methyl-6-t-butylphenol.

6. The process of claim 1 wherein said catalyst is 1,1'-dithio-di-2-naphthol.

7. The process of claim 1 wherein the methylene interrupted polyolefin fatty material is a polyunsaturated fatty acid.

8. The process of claim 1 wherein the methylene interrupted polyolefin fatty material is tall oil fatty acids.

9. The process of claim 1 wherein the methylene interrupted polyolefin fatty material is the isooctyl ester of tall oil fatty acids.

10. The process of claim 1 wherein the methylene interrupted polyolefin fatty material is soy fatty acid.

11. The process of claim 1 wherein the methylene interrupted polyolefin fatty material is linseed fatty acid.

References Cited

UNITED STATES PATENTS

| 1,896,467 | 2/1933 | Scheiber | 260—405.6 |
| 2,219,862 | 10/1940 | Bradley et al. | 260—407 |
| 2,263,887 | 11/1941 | Parkin | 260—407 |
| 2,298,917 | 10/1942 | Auer | 260—407 |
| 3,278,567 | 10/1966 | Rathjen et al. | 260—405.6 |

OTHER REFERENCES

Swern, ed., "Bailey's Industrial Oil and Fat Products," 3rd ed., Interscience Publishers, N.Y. (1964), pp. 497–99.

LEWIS GOTTS, Primary Examiner

D. G. RIVERS, Assistant Examiner

U.S. Cl. X.R.

260—405.6, 680 R, 683.2